United States Patent [19]
Lewis

[11] Patent Number: 6,142,511
[45] Date of Patent: *Nov. 7, 2000

[54] INFLATABLE PASSENGER RESTRAINT AND INFLATOR THEREFOR

[75] Inventor: Donald J. Lewis, Scottsdale, Ariz.

[73] Assignee: Universal Propulsion Company, Phoenix, Ariz.

[*] Notice: This patent issued on a continued prosecution application filed under 37 CFR 1.53(d), and is subject to the twenty year patent term provisions of 35 U.S.C. 154(a)(2).

[21] Appl. No.: 08/587,773

[22] Filed: Dec. 22, 1995

[51] Int. Cl.[7] .............................. B60R 21/18; B60R 21/26
[52] U.S. Cl. .............................. 280/733; 280/737
[58] Field of Search .................. 280/733, 730.1, 280/730.2, 737, 736, 741, 805, 808

[56] References Cited

U.S. PATENT DOCUMENTS

| | | | |
|---|---|---|---|
| 3,302,973 | 2/1967 | Ravau | 297/472 |
| 3,655,217 | 4/1972 | Johnson | 280/737 |
| 3,723,205 | 3/1973 | Scheffee | 280/741 |
| 3,820,842 | 6/1974 | Stephenson | 280/733 |
| 3,830,519 | 8/1974 | Lewis | 280/733 |
| 3,837,671 | 9/1974 | Hamilton | 280/733 |
| 3,841,654 | 10/1974 | Lewis | 280/733 |
| 3,848,887 | 11/1974 | Fox | 280/733 |
| 3,866,940 | 2/1975 | Lewis | 280/733 |
| 3,874,694 | 4/1975 | Stephenson | 280/733 |
| 3,897,081 | 7/1975 | Lewis | 280/733 |
| 3,944,769 | 3/1976 | Wagner | 200/83 A |
| 3,951,428 | 4/1976 | Sugiura et al. | 280/737 |
| 3,970,329 | 7/1976 | Lewis | 280/733 |
| 4,049,935 | 9/1977 | Gruber | 280/736 |
| 5,257,817 | 11/1993 | Cuevas | 280/736 |
| 5,290,060 | 3/1994 | Smith | 280/737 |
| 5,303,953 | 4/1994 | Kamiyama et al. | 280/733 |
| 5,348,344 | 9/1994 | Blumenthal et al. | 280/737 |
| 5,383,713 | 1/1995 | Kamiyama et al. | 297/741 |
| 5,589,141 | 12/1996 | Sides et al. | 280/741 |

FOREIGN PATENT DOCUMENTS

| | | | |
|---|---|---|---|
| 43 05 505 | 9/1993 | Germany | 280/733 |

*Primary Examiner*—Peter C. English

[57] ABSTRACT

Pyrotechnic particles in a frangible container partially combust upon a vehicle collision. The partial combustion opens the container. The partially combusted particles thereafter combust almost instantaneously (e.g. 2–5 milliseconds) in a housing enveloping the container and holding a gas. The resultant gas expansion provides for a communication between the housing and an opening normally isolated from the housing as by a rupturable diaphragm. The gas flowing through the opening inflates a belt portion disposed diagonally across the occupant's chest and shoulder and attached to a vehicle support structure (e.g. a pillar behind the occupant's seat), thereby protecting the occupant's chest, body, neck and head. The inflatable belt portion is attached to a lap belt portion as by multiple stitching, some of which becomes progressively, but not completely, detached to dissipate the forces imposed on the inflatable belt portion by the belt portion inflation. The lap belt portion extends through a coupling member adjacent the inflatable belt portion and laterally across the occupant's lap. The lap belt portion becomes tightened against the occupant's lap when the inflatable belt portion becomes inflated. The lap belt portion is removably coupled by the coupling member to a retainer at the inner side of the seat. When this removal occurs, the lap belt portion becomes disposed (e.g. wound) on a retractor to dispose the inflatable belt portion near the outboard seat side between the support structure and the retractor. The occupant can then enter and exit the vehicle without encumbrance.

52 Claims, 4 Drawing Sheets

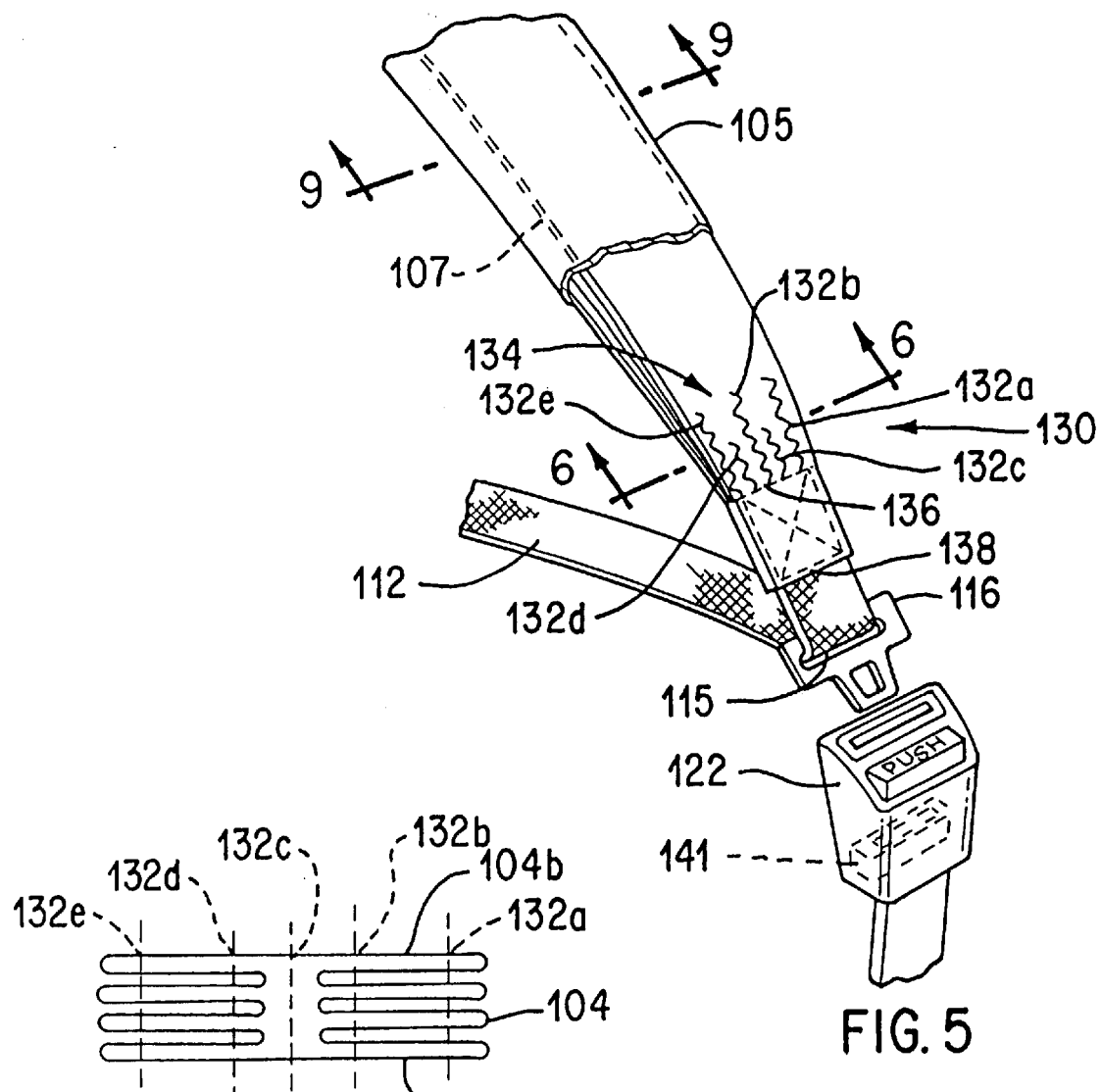

INFLATABLE PASSENGER RESTRAINT AND INFLATOR THEREFOR

This invention relates to a system for, and method of, providing an inflatable member, such as an inflatable bag or seat belt, in a vehicle and inflating the member to protect an occupant when a collision involving the vehicle occurs.

BACKGROUND OF THE INVENTION

Safety of occupants in vehicles is an important concern to manufacturers of the vehicles and to the occupants of the vehicles. The manufacturers have disposed seat belts, some partially or wholly inflatable, and inflatable air bags in the vehicles to protect the occupants when collisions involving the vehicle occur. An inflatable member (this term is used herein to describe an air bag as well as an inflatable belt or an inflatable belt portion) becomes inflated upon the occurrence of a collision involving a vehicle to reduce the occupant's velocity below unacceptable rates and to limit the occupant's movement to enhance the occupant's safety. Many manufacturers have started to provide inflatable members for occupants of the front driver seat.

Perhaps the most significant consideration in a vehicle containing an inflatable member relates to the fact that such a member cannot begin to restrain the occupant's motion during the vehicle collision until the occupant has moved into engagement with such member. Particularly in the case of air bags, which are typically deployed from the dashboard or steering wheel, this wastes an important portion of the time and deceleration space available to protect the occupant against injury. This markedly reduces the occupant's protection from the level which can be provided if the restraint is initiated before the occupant has moved within the vehicle after the vehicle collision.

Non-inflatable seat belts now in use almost immediately engage the occupant when a collision involving a vehicle occurs. However, such seat belts suffer from certain significant disadvantages. For example, although certain selected designs of seat belts can, through the use of pre-tensioning devices, begin a restraint of the occupant earlier than the restraint provided by an air bag, such belts do not provide for control of the occupant's head motion. This shortened deceleration time, however, has caused markedly higher decelerations and loadings, at least of the occupant's head, and has produced less than desirable results from the standpoint of injury thereto.

Seat belts are also often of narrow physical construction and thus have not provided for the distribution of the restraining loads over wide areas of the occupant's body. This has resulted in unnecessarily high loads being imposed upon the occupant over the limited portion of the occupant's body in engagement with the seat belt when a collision involving the vehicle occurs. Additionally such belts have possessed an elongation which, in many situations, has allowed the head of an occupant to strike the steering wheel or the dash board when the occupant has been seated in a front seat.

Furthermore, the spooling out of the webbing material in the seat belt and the stretching of the seat belt have contributed to an increased duration of the unrestrained motion of the occupant. This in effect has delayed the onset of any effective restraint. This has meant that the motion of the occupant has had to be brought to a stop in a shorter time than would have been possible if the seat belt had not elongated. This has contributed to the production of undesirably high rates of motion on the occupant during the restraint imposed by the seat belt on the movement of the occupant.

Even the use of inflatable seat belts of the types known in the prior art does not overcome all of the deficiencies and disadvantages discussed above. Prior attempts at eliminating these deficiencies and disadvantages with inflatable belts have included seat belts with a pair of inflatable sections within the belt and have additionally required the inflation of these sections to be accomplished by larger than desirable inflators. Previous attempts at producing satisfactory inflatable belts have also resulted in serious problems with storing the pair of inflatable sections in the vehicle and have required these inflatable sections to occupy areas which interfere with entrance and egress of the occupant respectively into and from the vehicle.

The deficiencies and disadvantages of prior art inflatable seat belts have also required the inflators to be positioned at the releasable coupling member and the retainer to be positioned at the sides of the seats. This duality of inflatable sections has caused many significant problems. One of these has been that the inflatable gases have had to pass through conduits located at the buckle attachment point of the belts that are in themselves releasable. This makes the belts and the inflator difficult to package and to operate.

It can be seen that the inflatable belts with dual inflatable sections have had to be attached to mechanisms which allow for variable lengths of the belts to be deployed due to variable sizes and positions of the occupants within the vehicle. This has required the inflator to be located at the buckle location with the aforementioned deficiencies or has required the heavy mass of the inflator to be contained within the inflatable sections of the seat belts. Furthermore, the duality of inflatable sections has required additional inflators, squibs, wiring and the like to be used since both of the inflatable sections in the pair have had to be simultaneously inflated.

Inflatable seat belts known in the prior art have other significant deficiencies and disadvantages. For example, they do not adequately protect the occupant's neck and head in a side collision. Furthermore, they also do not adequately protect the occupant's lower extremities. This results from the fact that the front seat occupant's lower extremities tend to slide forward against the instrument panel at the time of the collision while the occupant in the rear seat tends to slide against the rear of the front seat. This has caused the occupants to incur injuries to the lower extremities.

The inflators associated with prior inflatable seat belts have included combustible materials and associated apparatus which have operated in an inefficient thermodynamic manner. This has required excessive amounts of pyrotechnic materials to be provided in the inflators so that the size and weight of the inflators have had to be increased to undesirable proportions. The amount of the pyrotechnic material required in the inflators of the prior art have been roughly between fifty percent (50%) to one hundred percent (100%) more than the pyrotechnic material used in the inflator of this invention. As a result, acceptable packaging of the inflatable belts and the inflator within a vehicle has been precluded.

The configuration and composition of the combustible materials used in existing inflators have also produced relatively slow inflation systems. These slow inflation systems, while useful for air bags, have not been useful for inflatable seat belts since such restraints have to deploy in less than one fourth of the time for the deployment of a typical air bag. This has been necessitated by the fact that the inflatable belt and the inflatable side bag have to provide occupant protection from side impacts. Furthermore, the deceleration distance of a vehicle involved in a side collision and the time interval between the initiation of the side impact against the vehicle and the striking of the occupant against an interior vehicle surface are greatly reduced relative to the distance and time for a front impact.

The combustible materials for some of these systems have also required filters to collect the solid particulates that are produced. The solid particulates required to be filtered in such prior art systems have been excessive. Other systems have been required to utilize pyrotechnic grains. These grains have been of such size that grain fracture and cracking have occurred and have caused variations in the combustion surface, thereby detrimentally affecting the burning rates within the grains and hence the inflation time.

Furthermore, when large grains have been utilized with slow burning rates, the variations in performance over the range of operating temperatures has been undesirably large. For example, assuming a 40–50 millisecond function time, the changes in the burning rate of the pyrotechnic material have caused the function time of the inflator to vary by approximately ±20% when the temperature has been varied between 175° F. and −65° F. This has resulted from changes in the burning rate of the pyrotechnic material with variations in the operating temperature. This considerable percentage change in the burning rate has produced a change in overall function time of approximately 15–20 milliseconds, an appreciable portion of the time available to an air bag to decelerate the movement of the occupant. The change in overall function has produced a resultant variation in protection.

SUMMARY OF THE INVENTION

This invention provides a system which overcomes the above disadvantages and deficiencies. It comprises a seat belt combining an inflatable belt portion disposed adjacent the occupant's chest, neck and head and an interconnected lap belt portion consisting of standard webbing which becomes tightened against the occupant's lap when the inflatable portion becomes inflated. This significant enhancement in restraint prevents the occupant in a front seat from sliding against the instrument panel or the steering wheel at the time of vehicular impact, thereby protecting against injury to the occupant's knees and lower extremities. It also prevents the occupant in a rear seat from sliding against the back of a front seat.

Furthermore, when inflated, the inflatable belt portion shortens in effective length and displaces away from the chest of the occupant to provide, in combination, pretensioning of the inflatable belt portion, load distribution and a support cushion for the head in frontal collision. Additionally, by passing the inflatable belt portion across the shoulder and alongside the head, the inflatable belt portion protects the occupant's neck and head from injury due to side impact.

The invention also provides an inflator which responds almost instantaneously when a collision involving the vehicle occurs. For example, the inflator provides for the inflation of the inflatable belt portion in approximately ten milliseconds (10 ms) after being triggered by the vehicle collision. This is enabled in part by the use of a small pressure volume of approximately two (2) cubic inches in the inflator of this invention. This small volume exhausts quickly into the inflatable belt portion of this invention. In contrast, inflators of the prior art have had a volume of approximately 10–40 cubic inches. Furthermore, the inflator of this invention has a high pressure which accelerates the burn rate of the pyrotechnic material in the inflator of this invention.

The inflator of this invention is adapted for use with particles of a pyrotechnic material. Such particles cumulatively provide a large surface which enhances the burning rates of such particles. As a result, the small sizes of such particles provide for gas generation rates approximately ten (10) times greater than that of the inflators of the prior art. Furthermore, the relatively small amount of the pyrotechnic material in the inflator of this invention produces a minimal amount of any noxious by-products or noxious smells. The inflator is further advantageous in that all of the components in the inflator are disposed within a housing and in that a gas in the housing flows through a short opening directly into the inflatable belt portion to inflate the inflatable belt portion almost instantaneously after triggering by the vehicle collision.

When the particulate pyrotechnic material of this invention is subjected to the same temperature variation as given in the example above, i.e., −650 to +175° F., the overall time variation in the function time has been insignificant, particularly since the burning time of the propellant in the inflator of this invention is in the order of only 2–5 milliseconds. This has provided for a much more consistent performance and for a significantly greater protection of the occupant when using the inflator of this invention than when using the inflators of the prior art.

In one embodiment of the inflator in the invention, pyrotechnic particles in a frangible container located within the inflator housing partially combust upon a vehicle collision. The partial combustion opens the container. The partially combusted particles thereafter combust almost instantaneously (e.g 2–5 milliseconds) within the housing which also contains a gas. The resultant gas expansion provides for a communication between the housing and an opening normally isolated from the housing as by a rupturable diaphragm or a pop-off spring-loaded valve or by other such means known to those in the art. The gas flowing through the opening inflates a belt portion disposed diagonally across the occupant's chest and attached to a vehicle support structure (e.g. a pillar behind the occupant's seat), thereby protecting the occupant's chest, body, neck and head.

The inflatable belt portion of this invention is attached as by multiple stitching to webbing defining a lap belt portion. Some of this stitching becomes progressively, but not completely, detached to dissipate the forces imposed on the inflatable belt portion when the inflatable belt portion becomes inflated. The lap belt portion extends through an opening in a coupling member adjacent the inflatable belt portion and laterally across the occupant's lap.

The lap belt portion becomes tightened against the occupant's lap when the inflatable belt portion becomes inflated. The lap belt portion is removably attached as by the coupling member to a retainer at the inner side of the seat. When the coupling member is detached from the retainer, the lap belt portion becomes disposed (e.g. wound) on a retractor to dispose the inflatable belt portion near the outboard seat side between the support structure (e.g. the pillar behind the driver's seat) and the retractor. The occupant can then enter and exit the vehicle without encumbrance.

The inflatable belt portion can be enveloped within a cover made from a suitable material such as a polyester. The cover may be made from a single piece of material attached at its opposite ends as by stitching to define a cylinder enveloping the inflatable belt portion. The cover stitching progressively separates as the inflatable belt portion becomes progressively inflated in the downward direction. The cover is advantageous in that it provides for a controlled inflation of the inflatable belt portion in a direction away from the inflator. It also minimizes degradation of the material forming the inflatable belt portion as from ultraviolet light and protects the inflatable belt portion from degradation as from chafing against the occupant. A stiffener may be disposed in the cover against the inflatable belt portion to prevent the inflatable belt portion from twisting. Alternatively, the cover may be made from a frangible fabric material designed to burst open as the inflatable belt portion is inflated.

A switch may be disposed in the retainer in an open position. When the coupling member is disposed in the retainer, the switch becomes closed. The switch is included in an electrical circuit which is operative to initiate the combustion of the pyrotechnic material, upon the occurrence of a collision involving the vehicle, when the switch is closed. In this way, the inflatable belt portion can become inflated upon the occurrence of a collision involving the vehicle only when the inflatable system of this invention is connected to protect the occupant's body. This is important in view of the cost of manufacturing an inflatable system and installing the inflatable system in a vehicle.

BRIEF DESCRIPTION OF THE DRAWINGS

In the drawings:

FIG. 5 is a fragmentary perspective view of the unitary belt, including the inflatable belt portion and the lap belt portion, illustrating the attachment of the inflatable belt portion and the lap belt portion by an arrangement of stitches adapted for dissipating the stresses produced in the inflatable belt portion when the inflatable belt portion becomes inflated;

FIG. 6 is a fragmentary sectional view taken substantially on the line 6—6 of FIG. 5 and shows in additional detail the stitching attaching the inflatable belt portion and the lap belt portion to form the unitary belt, as well as the folding of the inflatable belt portion to produce a minimal stress on the inflatable belt portion when the inflatable belt portion becomes inflated;

FIG. 9 is a sectional view of the inflatable belt portion and a cover enveloping the inflatable belt portion and is taken substantially on the line 9—9 of FIG. 5.

DETAILED DESCRIPTION OF THE INVENTION

Figure 1:
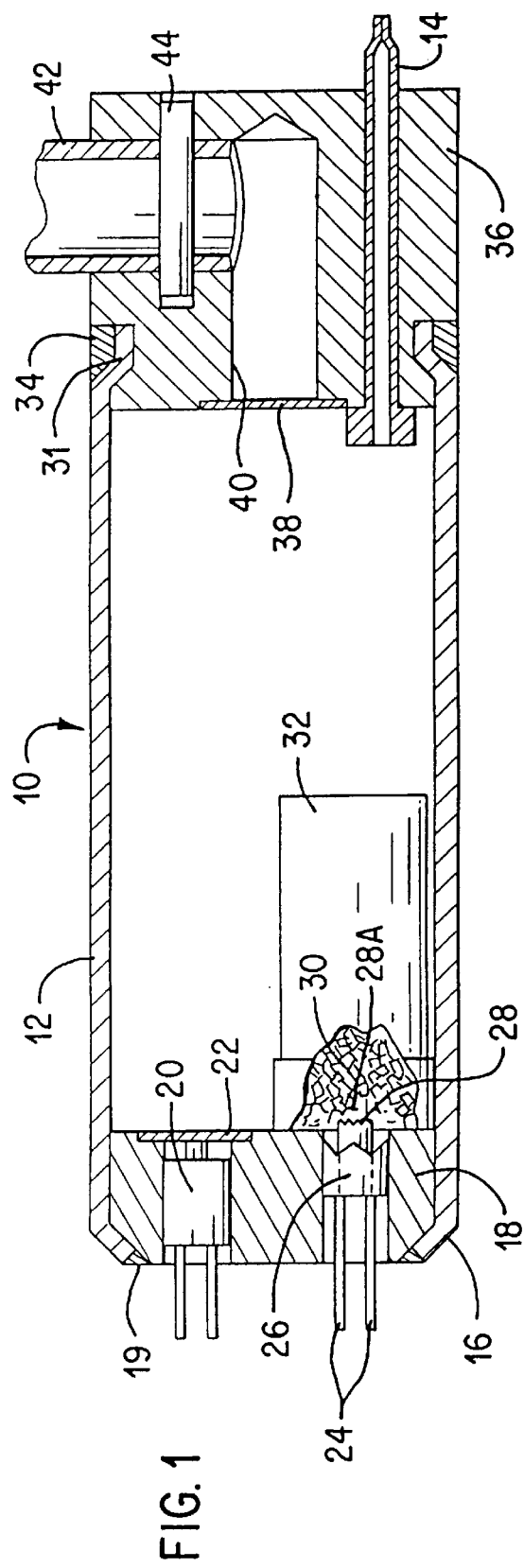
FIG. 1 is a sectional view of an inflator produced according to the invention, including a frangible container holding particles of a pyrotechnic material and including a housing enveloping the container and holding a gas, for producing thermodynamic energy for inflating an inflatable member such as an inflatable belt portion in a vehicle such as an automobile.
Figure 2:
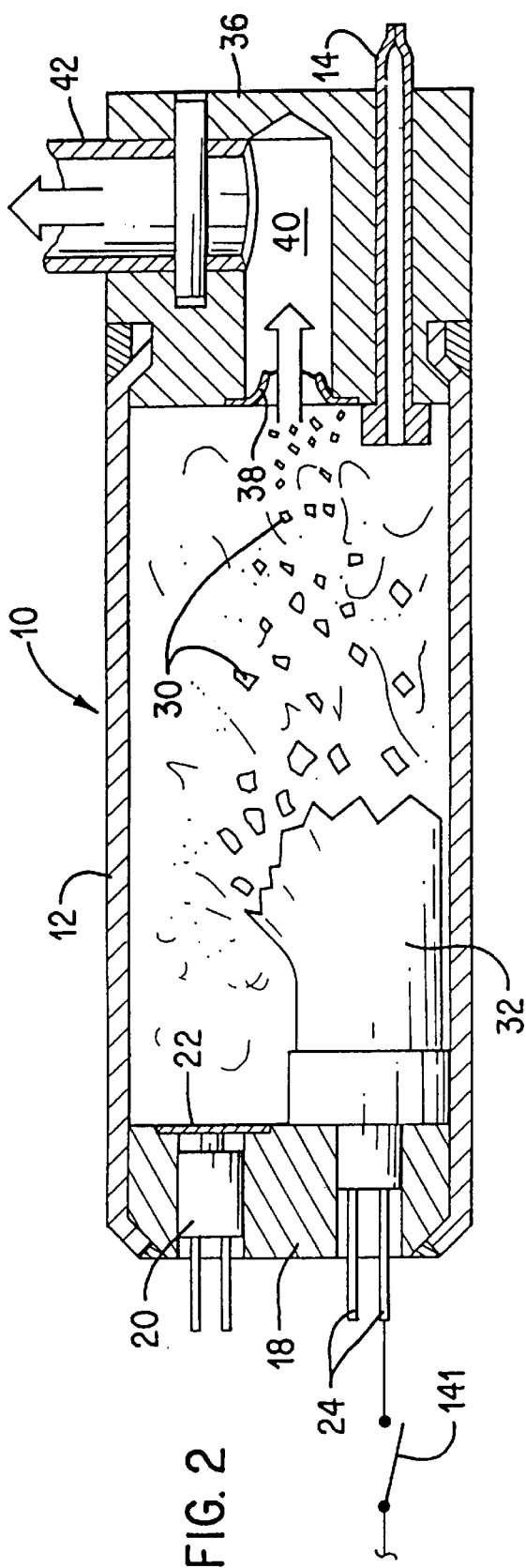
FIG. 2 is a sectional view similar to that shown in FIG. 1 but shows the inflator after the opening of the container as a result of a partial combustion of the particles of the pyrotechnic material in the container and further schematically shows the continued combustion of the pyrotechnic particles in the housing.

One embodiment of an apparatus (an inflator) for inflating an inflatable member such as an inflatable belt portion is generally indicated at 10 in FIGS. 1 and 2. Although the inflator 10 is described in this application as being particularly useful for inflating a member in a vehicle, it will be appreciated that the inflator may be useful in inflating members in other objects than vehicles.

In the embodiment of the inflator shown in the drawings, a housing 12 is provided. The housing 12 may be made from a material with a low thermal conductivity to serve as a pressure vessel for holding a gas, preferably a gas such as nitrogen, helium or argon. Argon is the preferred gas. All of these gases are preferably inert. The gas may be inserted into the housing 12 through a hollow pin 14 which may be closed as by welding after the gas has been inserted into the housing.

The housing 12 may be crimped as at 16 to hold an insert 18 preferably having a low thermal conductivity. The housing 12 and the insert 18 may be formed from a metallic material preferably of a low thermal conductivity or from a material with an interior surface coating of a low thermal conductivity. The housing 12 and the insert 18 may also be formed from an epoxy, fiber glass, nylon or a number of other suitable materials having a low thermal conductivity, all which are well known in the art. A ring 19 is disposed in the housing 12 adjacent the crimp 16 to provide a seal for preventing gas leakage from the housing.

A switch 20 may be disposed in the insert 18. A diaphragm 22 may be pressed against the switch 20 when the pressure of the gas in the housing 12 exceeds a predetermined value. When the pressure of the gas in the housing 12 becomes less than such predetermined value, the diaphragm 22 becomes displaced from the switch 20. The switch 20 then becomes closed to illuminate a light on the instrument panel or display panel (not shown) at the front of the occupant compartment in the vehicle, thereby indicating that the inflator 10 is not operative. The operation of the switch 20 may provide a signal to associated electronic circuitry. This signal provides an indication that the inflator 10 is in a defective state. Such associated circuitry is believed to be known to a person of ordinary skill in the art.

A plug 26 may be made from a material having a low thermal conductivity. Preferably the plug 26 has the same composition as the material of the insert 18. Connector pins 24 extend into the plug 26. The connector pins 24 are connected electrically to a bridge wire 28. The bridge wire 28 is preferably coated or in direct juxtaposition with a first firing compound 28A which is selected to appropriately interface electronically and thermally with the electro-thermal characteristics of the bridge wire 28 so as to provide the desired ignition of particles of a pyrotechnic material 30.

The bridge wire 28 and the first firing compound 28A are believed to be known in the art. Pins 24, plug 26, bridge wire 28 and firing compound 28A constitute an ignitor.

The particles of the pyrotechnic material 30 are disposed within a frangible container 32 in juxtaposition to the first firing compound 28A. The plug 26 electrically isolates the connector pins 24, one from the other, to prevent electrical shorting. The burning time of the pyrotechnic material 30 may be between approximately one millisecond (1 ms.) and approximately thirty milliseconds (30 ms.) and is preferably between approximately two millisecond (2 ms.) and approximately five milliseconds (5 ms.), depending upon the application.

The combustible or pyrotechnic material 30 may constitute relatively small particles or granules with a size in the range of approximately 0.010 inches to approximately 0.060 inches. The particles may typically have physical dimensions approximately 0.050 inch in diameter and approximately 0.20 inch thick or physical dimensions which are roughly spherical and granular with a sixteen (16) mesh size.

Material 30 may illustratively constitute particles of a material designated as UPCO 302 or UPCO 718 by applicant's assignee of record in this application. The particles of the pyrotechnic material 30 may comprise a mixture of different sizes to control the time for the combustion of the combustible material. When used in the quantities required for the inflator 10, the material 30 has properties of providing by-products when partially combusted, or end products when fully combusted, that are environmentally safe and that do not produce offensive or noxious smells when used in the small quantities associated with the inflator 10. The term "environmentally safe" as used herein is meant to indicate that the by-products and end products from the combustion of the pyrotechnic material 30 do not injure the occupant or damage the vehicle or the atmosphere.

The material designated as "UPCO 718" is particularly advantageous since it produces environmentally safe material when it combusts. The material designated as "UPCO 302" is advantageous because it generates a higher heat of combustion than the material "UPCO 718" but is disadvantageous in that it may generate some environmentally unsafe products such as carbon monoxide when it combusts. However, to counter this, a sufficient amount of oxygen can be included in the housing 12 to oxidize all of the carbon monoxide to carbon dioxide. Furthermore, an additional fuel can be included in the housing 12 to combust with any excessive oxygen in the housing 12 if such oxygen exists in the housing after the combustion of the pyrotechnic material from the container 32.

The housing 12 may be crimped as at 31 and a ring 34 may be provided at the crimp to seal the housing to a manifold 36. The ring 34 may be affixed to the housing 12 by well known means other than a crimp. The manifold 36 may be made from a material having a low thermal conductivity and may preferably correspond in composition to the insert 18 and the plug 26. A rupturable diaphragm 38 may be disposed across an opening 40 in the manifold 36 to isolate the opening from the housing 12 until the diaphragm becomes ruptured. It will be appreciated that other means than the diaphragm 38 may be used to isolate the housing 12 from the opening 40, and to provide a communication between the housing and the opening when the gas in the housing expands. For example, a spring-biased pop-off valve may be used instead of the diaphragm 38.

Figure 4:
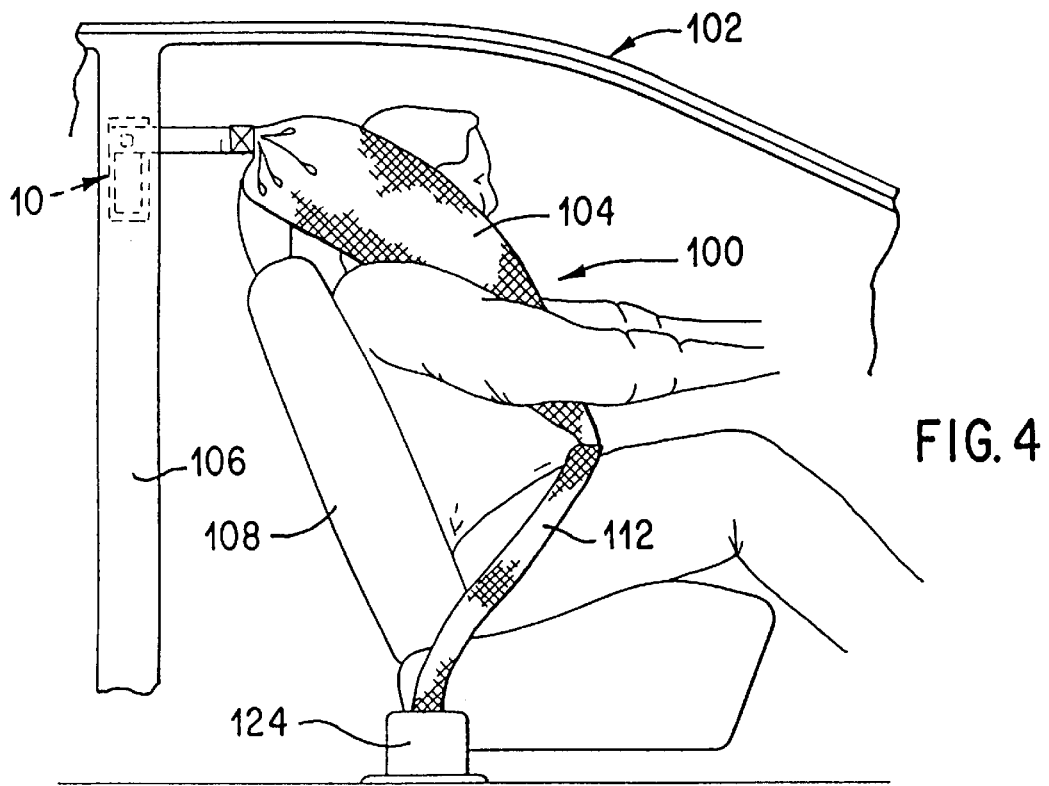
FIG. 4 is a schematic fragmentary side elevational view of the vehicle and the occupant seated in the vehicle and shows the disposition of the inflatable belt portion and the lap belt portion after the inflation of the inflatable belt portion.

The opening 40 communicates with a conduit 42 extending from the manifold 36. The conduit 42 is preferably disposed fixedly in the manifold 36 as by a pin 44 or may be rotatably affixed as by a snap ring or by other means known in the art. Alternatively, the conduit 42 may be capable of a relative rotation about its axis to assist in providing the most desirable position for inflating an inflatable belt portion 104 (FIG. 4) as the inflatable belt portion passes over the occupant's body. The conduit 42 communicates with the inflatable belt portion 104 (FIG. 4). It will be appreciated that the conduit 42 may be omitted if the opening 40 is intended to communicate directly with the inflatable belt portion 104.

When a collision involving the vehicle occurs, a signal passes through the connector pins 24 to the bridge wire 28. This may be accomplished in a manner well known in the art. The bridge wire 28 then becomes heated to ignite the first firing compound 28A which in turn ignites particles of the combustible material 30. The frangible container 32 becomes opened or ruptured by the heat generated from the combustion of the particles of the combustible material 30.

The rupture of the container 32 occurs after a relatively short period of time such as approximately one millisecond (1 ms). At the end of this time, the particle size of the pyrotechnic material 30 has been diminished somewhat, but not significantly, by the partial combustion of the particles. After the rupture of the container 32, the partially combusted particles of the pyrotechnic material 30 pass into the housing 12 where such particles continue to combust. This combustion occurs for a relatively short period of time such as approximately two to five milliseconds (2–5 ms). As shown schematically in FIG. 2, the particles of the pyrotechnic material travel in a direction away from the container toward the opening 40 and combust as they travel in this direction. This causes the particles of the pyrotechnic material 30 to diminish in size as they travel from the container 32 toward the opening 40.

The composition of the particles of the pyrotechnic material 30 and the combustion of the particles of the pyrotechnic material at progressive positions in the housing 12 offer certain important advantages. The pyrotechnic material 30, and particularly the "UPCO 718" material, combusts to produce by-products and end products which are not injurious to the environment or to the occupant. This is also true of the "UPCO 302" material when additional amounts of oxygen or fuel are disposed in the housing 12.

Furthermore, the combustion of the particles of the pyrotechnic material 30 in the housing 12 causes the heat generated by such combustion to be transferred directly and thermally to the molecules of the gas in the housing 12 without substantial contact with the housing 12, the end plug 18 and the manifold 36. The housing 12, the container 32, the end plug 18 and the manifold 36 present low thermal conductivity surfaces to interface with the heated gas, thereby causing the liberated heat from the combustion of the pyrotechnic combustion to be utilized effectively only to heat and expand such gas. Furthermore, the container 32 and the housing 12 do not absorb any significant amount of the generated heat because they are relatively thin and because the inflator 10 does not contain any filters which would absorb a significant amount of the thermal energy from the gas as the gas passes through the filters.

As previously indicated, the gas in the housing 12 is preferably nitrogen, helium or argon. All limit chemical reaction between the pyrotechnic material 30, or any by-products or end products resulting from the combustion of such pyrotechnic material, and such gas. Of the inert gases, argon is preferred because it has a low thermal conductivity. As a result, a substantial portion of the heat generated by the combustion of the particles of the pyrotechnic material 30 is trapped within the molecules of the argon gas. This heat is used to raise the temperature of the molecules of the argon gas in the housing 12. It expands the argon gas in the housing and increases the pressure of the argon gas against the diaphragm 38.

The frangible container 32 and the housing 12 also co-operate in maximizing the temperature increase of the gas in the housing 12 as a result of the heat generated by the particulate combustion. The housing 12 and the container 32 are made from low thermal conductivity materials, at least on the surfaces in contact with the gas. Such materials may be ceramics, rubber coatings, polyethylene coatings and the like. These materials have thermal conductivities of approximately 1 to 15 K/W(M.K.) as compared to a range of conductivities from 50 to 200 K/W (M.K.) when a relatively high thermal conductivity material such as steel or aluminum is used for the housing 12 and the container 32.

The housing 12 and the container 32 also do not absorb any significant amount of the generated heat because they are exposed to high temperatures only for relatively short periods of time of approximately ten milliseconds (10 ms) or less. This is in contrast to existing inflators which function at such elevated temperatures for approximately thirty to sixty milliseconds (30–60 ms). During such relatively extended periods of time, heat is transferred to the members forming such inflators.

When the gas has expanded sufficiently in the housing 12, the diaphragm 38 breaks and the gas expands through the opening 40 and the conduit 42. The conduit 42 may be optional. By eliminating the conduit 42, the heated gas is transferred directly through the opening 40 to the inflatable belt portion 104. The area of the diaphragm 38 and the cross sectional areas of the opening 40 and the conduit 42 may be selected to control the time for the rupture of the diaphragm 38 and the flow of the gas through the opening and the conduit into the inflatable belt portion 104. The particular composition of the pyrotechnic material 30 and the relative sizes of the different particles in such material also control the time within which the gas is to be heated within the container 32. Such particular composition accordingly controls the time for the gas to flow into the inflatable belt portion 104.

Figure 3:
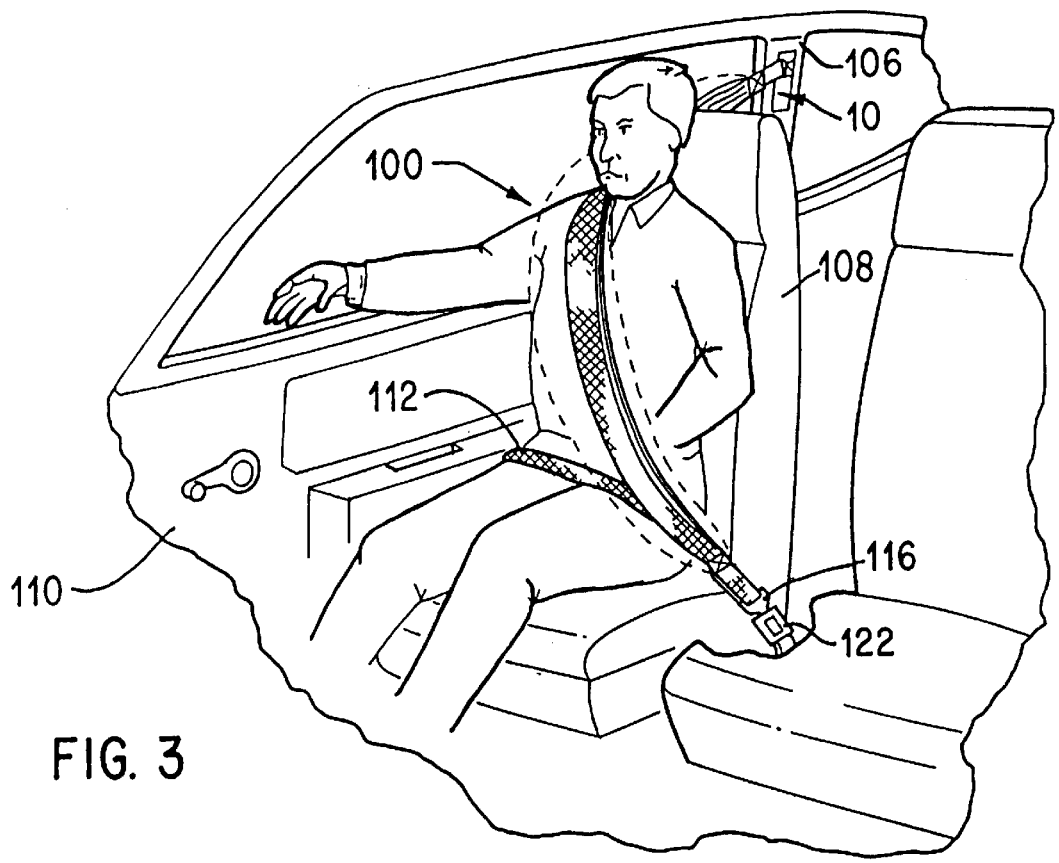
FIG. 3 is a schematic fragmentary perspective view of a vehicle including a unitary belt, comprising an inflatable belt portion and a non-inflatable lap belt portion, adapted to restrain the movements of an occupant seated in the vehicle in the event of a collision involving the vehicle.

The gas flowing through the conduit 42 passes into an inflatable member such as the inflatable belt portion 104 which may be made from a suitable material such as nylon and may be included in a unitary belt generally indicated at 100 (FIGS. 3 and 4). Although the discussion in this specification is specifically directed to the inflatable belt portion 104, it will be appreciated that the inflator 10 may be used with other types of inflatable members, including air bags, than the inflatable belt portion 104.

The unitary belt 100 is adapted to be disposed in a vehicle generally indicated at 102. The unitary belt 100 is constructed to protect an occupant in the event of a collision involving the vehicle 102. As illustrated in FIGS. 3 and 4, the inflatable belt portion 104 of the unitary belt 100 is attached at its upper end to a support structure such as a pillar 106 which is disposed at the side of the vehicle 102 and above a seat 108 which holds the occupant. The pillar 106 is disposed to the rear of a vehicle door 110 through which the front seat occupant enters and exits. The support structure may alternately constitute any other suitable portion of the vehicle. For example, the support structure may constitute a flange on the inner surface of the roof portion when the inflatable belt portion 104 protects an occupant in the rear seat of the vehicle.

The inflator 10 shown in FIG. 4 is preferably disposed at the upper end of the inflatable belt portion 104. When the inflatable belt portion 104 is attached to the pillar 106, this attachment may be at the upper end of the pillar 106. The inflatable belt portion 104 may be preferably integrated between a decorative fascia with the standard shoulder belt adjustment mechanism enabling the upper position of the inflatable belt portion to fit most favorably the full range of occupants. The inflatable belt portion 104 is preferably disposed above the occupant's shoulder and actually even above the occupant's neck and approximately at a horizontal level approximating the occupant's left cheek (if the occupant is the driver) or approximating the top of the occupant's head.

The inflatable belt portion 104 may be folded in a manner as shown in FIG. 6. As shown in FIG. 6, the inflatable belt portion 104 is provided with a pair of opposed wall portions 104a and 104b laterally displaced from each other. Each of the wall portions 104a and 104b extends in a zig-zag configuration from the lateral extremity of such wall portion to a position intermediate the lateral distance between the lateral extremities of such wall portions. This relationship enhances the speed at which the inflatable belt portion 104 can be inflated downwardly from the top of the inflatable belt portion. It also enhances the uniformity in the inflation downwardly of the inflatable belt portion 104.

A cover 105 (FIG. 9) preferably envelopes the inflatable belt portion 104. The cover 105 may be formed from a suitable material such as a polyester and may be provided with a color matching the decor of the interior of the vehicle 102. The cover 105 may be formed from a single piece of material attached at its opposite ends as by stitching 109. The stitching 109 may be disposed to face the chest of the occupant so that it is not visible to other occupants in the vehicle. The cover 105 becomes separated progressively from the inflatable belt portion 104 as the inflatable belt portion becomes inflated. A stiffener 107 is disposed within the cover 105 against the inflatable belt portion 104 to prevent the inflatable belt portion 104 from twisting so that it is in a flattened configuration prior to inflation.

The cover 105 provides certain advantages. It prevents the inflatable belt portion 104 from becoming degraded as from ultraviolet light. It also prevents the inflatable belt portion 104 from becoming degraded as from chafing against the chest of the occupant. It additionally holds the inflatable belt portion 104 to a consistent initial minimal volume and holds the folds of the inflatable belt portion to provide a consistent unfolding of the belt portion. The stiffener 107 also assists in retaining the folds of the inflatable belt portion 104 to provide a consistent unfolding of the belt portion.

The inflatable belt portion 104 extends diagonally (at a transverse angle) downwardly to a position near, but above, the occupant's lap at the inner or inboard side of the occupant's seat 108. In this diagonal or transverse configuration, the inflatable belt portion 104 crosses the occupant's chest. At the lower position, the inflatable belt portion 104 is suitably connected to a standard seat belt webbing material which forms a lap belt portion 112. The lap belt portion 112 may be made from a suitable material such as nylon. The construction of the lap belt portion 112 may correspond to the construction of the lap belts now in use. The inflatable belt portion 104 and the lap belt portion 112 may be considered to form a unitary belt.

At a position adjacent the occupant's lap, the lap belt portion 112 extends through a D-ring coupling member 116

Figure 8:
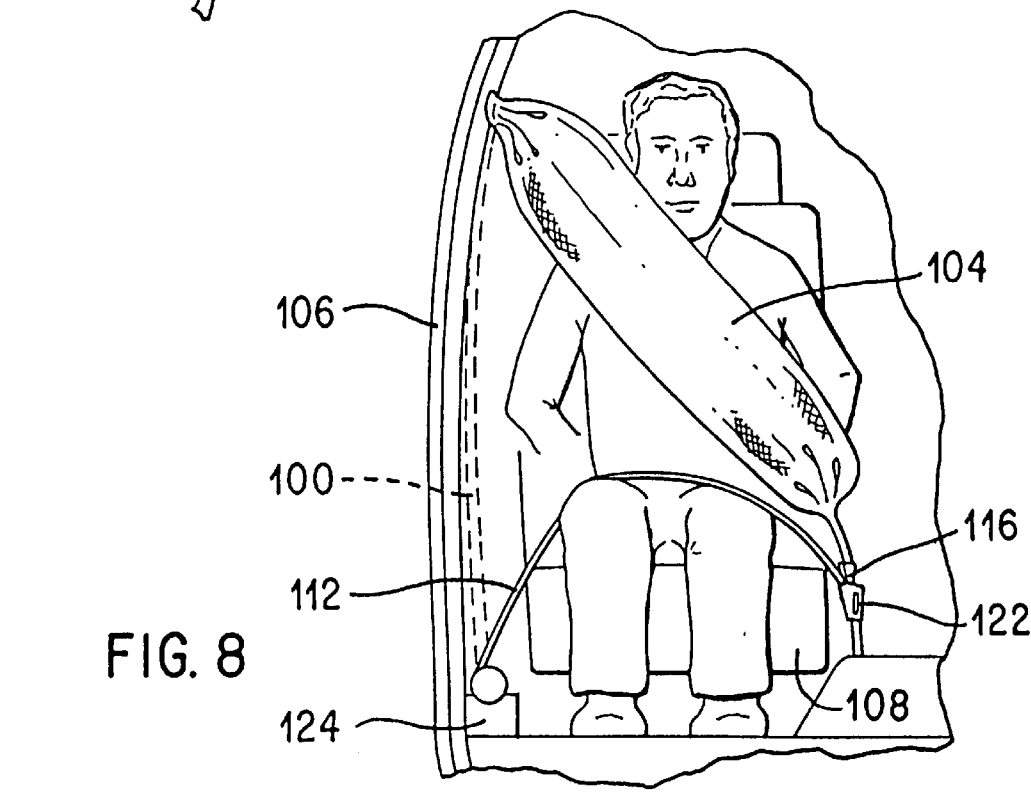
FIG. 8 is a front elevational view of a seated occupant and shows the unitary belt, including the inflatable belt portion and the lap belt portion, in solid lines with the inflatable belt portion and the lap belt portion restraining the occupant, while showing the inflatable belt portion in broken lines with the inflatable belt portion and the lap belt portion in a non-restraining stowed position.

(FIG. 8). A D-ring coupling member such as the D-ring coupling member 116 is well known in the art. The D-ring coupling member 116 has an opening 115 (FIG. 5) through which the lap belt portion 112 extends to change the direction of the lap belt portion 112 from a downward and transverse direction to substantially a horizontal direction (FIG. 8) in which the lap belt portion extends across the occupant's lap. At its inner end, the lap belt portion 112 is attached to the D-ring coupling member 116 (FIG. 3) which is removably coupled to a retainer 122 in the vehicle. The construction of the D-ring coupling member 116 and the retainer 122 is well known in the art for use in vehicles such as automobiles now on the market.

The inflatable belt portion 104 becomes inflated downwardly from the top of the belt when the inflator 10 is actuated. This is advantageous because it is desirable to exclude the mounting of the inflator 10 in undesirable locations such as the buckle and retractor locations due to their attendant gas and electrical connection deficiencies. Furthermore, the inflation of the inflatable belt portion 104 downwardly from the top of the inflatable belt portion facilitates protection initially of the head, neck and chest of the occupant. This results from the fact that an injury to the occupant's head, neck and chest can be life-ending but an injury to the occupant's lower extremities such as the occupant's knees and ankles is generally at worst crippling but not life-ending. Furthermore, in the case of a side impact of the vehicle 102, the time available for interspacing the protective cushion between the head and the interior of the side of the vehicle in a collision against the side of the vehicle is relatively short (e.g. 10–15 milliseconds). The downward inflation of the inflatable belt portion 104 from the top of the inflatable belt portion is particularly beneficial in such situations.

As will be seen from FIG. 4, the inflatable belt portion 104, when inflated, protects the occupant's neck and head. This controls the occupant's head motion by providing an inflated cushion which supports the occupant's head from beneath the chin and prevents the occupant's head from rotating violently in a forward direction. When the occupant's head rotates violently forward, as in the prior art, accompanied by a forward movement of the occupant's chest, the occupant's head may impinge against the dashboard or instrument panel or steering wheel (when the occupant is in a front seat) unless adequate restraint against this movement is provided as in this invention. Furthermore, the occupant's neck may be severely strained, as in the prior art, as a result of the violent jerk imparted downwardly to the neck at the time of the collision. It will be appreciated that the occupant's chest and legs are also protected by the inflatable belt portion of this invention. When the occupant is sitting in a rear seat, the occupant's neck and head are protected in this manner by the inflatable belt portion of this invention from moving against the rear of the front seat.

When the inflatable belt portion 104 becomes inflated, its effective length is shortened as the path length of the inflated material in the inflatable belt portion is forced outwardly. This in turn draws the webbing portion of the lap belt portion 112 through the D-ring portion of the coupling member 116 when the coupling member is coupled to the retainer 122. This causes the lap belt portion 112 to become tightened against the lap of the occupant.

The lap belt portion 112, when tightened by the inflation of the inflatable belt portion 104, restricts the movements of the occupant's lower torso. This inhibits the occupant's lower body from sliding forwardly and accordingly significantly mitigates the chance that the occupant's knees and feet will be injured. It also positions occupant's upper torso so that the occupant's head and chest can be most effectively restrained.

The amount of the pyrotechnic material 30 in the container 32 is so small and the inflation of the inflatable belt portion 104 is so fast that the temperature of the inflatable belt portion increases only a minimal amount. For example, the temperature rise of the inflatable belt portion 104 as a result of the inflation of such belt portion may be approximately only 7° Fahrenheit. This prevents the occupant from being burned such as sometimes occurs in the inflatable belts of the prior art.

Figure 7:
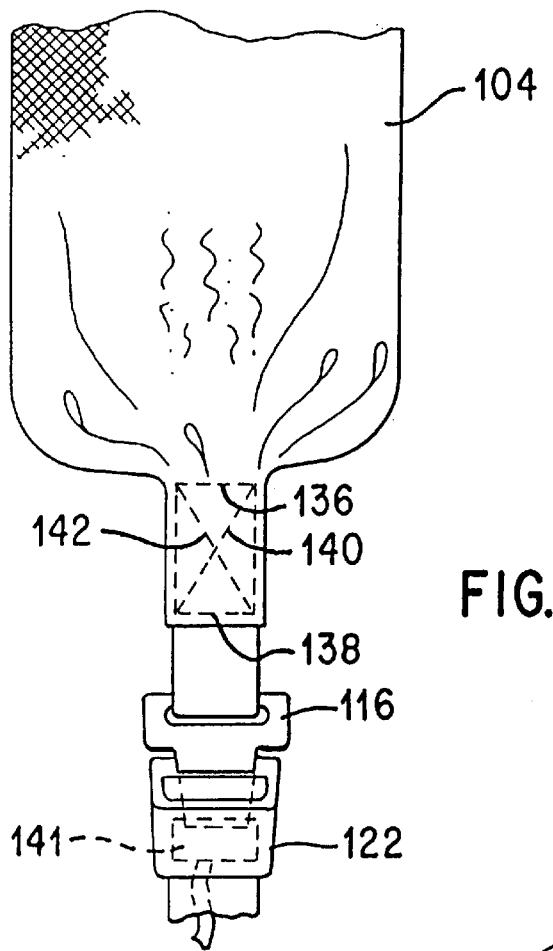
FIG. 7 is a fragmentary view showing in additional detail the stitching also shown in FIGS. 5 and 6 and illustrating the use of the seat belt stitching in the area where the inflatable belt portion remains folded even after inflation, this stitching being used to transmit loads from the inflatable belt portion to the lap belt portion.

As shown in FIGS. 5 and 6, the inflatable belt portion 104 is relatively narrow before inflation. This results from the zig-zag configuration of each of the wall portions 104a and 104b from the lateral extremity of such wall portion to a position intermediate the wall portions. This is shown in FIGS. 5 and 6. However, when the inflatable belt portion 104 becomes inflated, it expands so that the lateral distance between the wall portions 104a and 104b becomes considerably increased. This is best seen in FIGS. 7 and 8. This is advantageous since the unit force imposed upon the occupant's body at any position on the chest, neck and head of the occupant's body is considerably reduced by the significant increase in the area of contact of the inflatable belt portion 104 against the occupant's body.

The lap belt portion 112 is adapted to be coupled to a retractor 124 fixedly disposed in the vehicle near the floor of the vehicle. The retractor 124 may be constructed in a conventional manner well known in the art to dispose (e.g. wind) the lap belt portion 112 on the retractor or allow the unwinding of the lap belt portion from the retractor. Suitable retractors are used with lap belts in vehicles now on the market. For example, the retractor 124 may constitute a Webbing Velocity Sensitive Retractor (Part No. 501580-4031) manufactured and sold by Am-Safe of Phoenix, Ariz. This retractor is incorporated by reference in this application.

The retractor 124 prevents the lap belt portion 112 from being extended upon the occurrence of a collision involving the vehicle 102. Since the lap belt portion 112 cannot be extended at such a time, the inflation of the inflatable belt portion 104 produces a tightening of the lap belt portion 112 against the lap of the occupant. At the same time, the inflatable belt portion 164 becomes disposed adjacent to the occupant's head, neck and chest to substantially restrain movement of these portions of the occupant's body.

When the coupling member 116 (FIGS. 3 and 5) is detached from the retainer 122 in a manner well known in the art, the retractor 124 causes the lap belt portion 112 to become disposed (e.g. wound) on the retractor. As a result, the inflatable belt portion 104 becomes disposed downwardly to a position adjacent, but to the rear of, the seat 108. This is shown in broken lines in FIG. 8 In the instance where the upper end of the inflatable belt portion 104 is attached to the pillar 106, the occupant is able to enter and exit the vehicle through the front door without any obstruction from any portion of the inflatable belt portion 104 since the pillar is to the rear of the front door.

As will be seen, the inflatable belt assembly 100 is advantageous because it can be retrofitted in a vehicle without having to adjust any of the components or subassemblies in the vehicle. The unitary belt 100 can be provided for the occupant of the driver's seat, the occupant of the other front seat and the occupants in the rear seats. The unitary belt 100 is provided as an integral assembly in each of these seats, in part because the inflator 10 for inflating the inflatable belt portion 104 is disposed in juxtaposition to such inflatable belt portion.

As will be appreciated from the above discussion, the inflatable belt portion 104 becomes inflated almost instantaneously after the occurrence of a collision involving the vehicle. As the inflation reaches the bottom of the inflatable belt portion 104, it exerts a large stress at the position of thickness discontinuity between the relatively thin section of the inflatable belt portion 104 and the thicker portion of the webbing of the standard seat belt construction as represented by the lap belt portion 112. This webbing constitutes the material of the lap belt portion 112. The position of the thickness discontinuity is at the position where the inflatable belt portion 104 is attached to the lap belt portion 112.

The large stress at the position of the thickness discontinuity between the inflatable belt portion 104 and the lap belt portion 112 would tend to tear the thin material of the inflatable belt portion 104 and separate the inflatable belt portion 104 from the lap belt portion 112 if measures were not provided to prevent this from occurring. If the inflatable belt portion 104 became fully separated from the lap belt portion 112, the effects of inflating the inflatable belt portion 104 would be lost from the standpoint of protecting the occupant.

FIGS. 5–7 show a stitching arrangement generally indicated at 130 for resolving the problem discussed in the previous paragraph. The stitching arrangement includes pluralities 132*a*, 132*b*, 132*c*, 132*d* and 132*e* of stitches 134. The stitches 134 in each of the pluralities 132*a*, 132*b*, 132*c*, 132*d* and 132*e* are arranged in a saw-tooth or zig-zag pattern in which the stitches in such plurality extend along the overlapping lengths of the belt portions 104 and 112 and in which alternate ones of the pluralities 132*a*, 132*b*, 132*c*, 132*d* and 132*e* of the stitches 134 have first lateral positions and the other ones of the pluralities of the stitches have lateral positions different from the first lateral positions. The pluralities 132*a*, 132*b*, 132*c*, 132*d* and 132*e* of the stitches 134 are displaced laterally from one another. Preferably each of the pluralities of stitches 132*a*, 132*b*, 132*c*, 132*d* and 132*e* of the stitches 134 is equally spaced in the lateral direction from the adjacent pluralities of stitches.

As best seen in FIG. 5, the pluralities 132*a*, 132*c* and 132*e* of the stitches 134 have a greater length than the pluralities 132*b* and 132*d* of the stitches 134. The pluralities 132*b* and 132*d* of the stitches 134 are preferably disposed respectively between the pluralities 132*a* and 132*c* of the stitches 134 and between the pluralities 132*c* and 132*e* of the stitches 134. This arrangement is provided primarily to reduce any sudden rise in stress as the stress loads are transitioned from the thin material of the inflatable belt portion 104 to the thicker webbing of the lap belt portion 112. It will be appreciated that the pluralities 132*a*, 132*b*, 132*c*, 132*d* and 132*e* of the stitches 134 may have the same or variable lengths without affecting the scope of the invention.

At a position removed in the inflatable belt 104 from the pluralities 132*a*, 132*b*, 132*c*, 132*d* and 132*e* of the stitches 134, additional stitches 136 and 138 (FIGS. 5 and 7) are disposed laterally across the widths of the overlapping inflatable belt portion 104 and the lap belt portion 112 at spaced positions along the overlapping lengths of the inflatable belt portion and the lap belt portion. Additional stitches extend diagonally from each lateral edge of the stitches 136 to the other lateral edge of the stitches 138 to define a criss-cross pattern. Such diagonal stitches are indicated at 140 and 142. These stitches serve to transmit the loads carried by one lateral edge of the inflatable belt portion 104 along the lateral dimensions of the inflatable belt portion 104 and the lap belt portion 112 to the other lateral edge of the inflatable belt portion.

When the inflatable belt portion 104 becomes inflated downwardly from the upper position of such belt portion, the force produced on the thin inflatable cloth constituting the inflatable belt portion 104 at the bottom end of such inflatable belt portion acts upon progressive ones of the stitches 134 in each of the pluralities 132*a*, 132*b*, 132*c*, 132*d* and 132*e*. This action loads each stitch progressively to the point of separation and thereby provides for a separation of such stitch. This may be illustratively seen in FIG. 7.

As the thin cloth at the lower end of the inflatable belt portion 104 becomes inflated and separated at the progressive ones of the stitches 134 in each of the pluralities 132*a*, 132*b*, 132*c*, 132*d* and 132*e*, the force is attenuated by the energy absorption of the breaking threads so much that the thin cloth is protected and remains fully intact and transmits the belt loads from the inflatable belt portion 104 to the lap belt portion 112. The zig-zag stitches are preferably at angles approximately 45° relative to the path of the inflatable belt portion 104 and are composed of threads whose breakage strength is such that every thread breaks sequentially, one after the other, so as to establish a maximum limit on the cloth load.

Inflatable belt assemblies are costly. It is accordingly desirable that the unitary belt 100 becomes inflated only when it is intended to be used. To accomplish this, a switch 141 (FIG. 5) is disposed in retainer 122. The switch 141 is closed only when the coupling member 116 is coupled to the retainer 122. The switch 141 is connected in a circuit with the connector pins 24 in FIG. 2. As a result, the inflator 10 is actuated to obtain a combustion of the pyrotechnic material 30 only when the switch 141 is closed. This prevents the inflatable belt portion 104 from being inflated except when the occupant intends to obtain the protection provided by the unitary belt 100.

The system constituting this invention has certain important advantages in its individual sub-systems and in its assembly relationship. For example, the inflator 10 provides an almost instantaneous opening of the container 32 (FIGS. 1 and 2) and the heating of the gas in the housing 12 because of certain advantages in the inflator. These advantages include the composition of the pyrotechnic material 30, the formation of the pyrotechnic material as particles, the partial combustion of the particles of the pyrotechnic material in the container 32 and the combustion thereafter of the particles of the pyrotechnic material in the housing 12 as such particles burn in juxtaposition in the housing to the gas with the low thermal conductivity. These advantages also include the minimal number of components in the inflator 10 and the thin and insulated walls of different components including the container 32, the housing 12 and the manifold 36 and the materials from which these components are made.

Furthermore, since the pyrotechnic material 30 is in powder or granular form as distinguished from the larger grains used in some inflators in the prior art (20 times the size of the particles or grains of the pyrotechnic material of this invention), the combustion of the pyrotechnic material 30 can occur in a time considerably shorter than in the prior art. This fast combustion of the pyrotechnic material 30 also results in part from the small quantity of the pyrotechnic material in the container 32 and also in part from the relatively high pressure of about twelve thousand pounds per square inch (12,000 psi) at which combustion occurs, as compared to the prior art. The inflator 10 of this invention also provides for substantially uniform operating characteristics in the unitary belt 100 even with considerable changes in the ambient temperature in the vicinity of the vehicle.

The unitary belt 100 also has certain important advantages. When the inflatable belt portion 104 becomes inflated, it protects the occupant's chest, neck and head. It also tightens the lap belt portion 112 against the occupant across the occupant's lap. This provides additional protection for the occupant's lower extremities. When the occupant desires to enter or exit the occupant door 110, the coupling member 116 is detached from the retainer 122 and the lap belt portion 112 becomes disposed (e.g. wound) on the retractor 124. This disposes the inflatable belt portion 104 substantially along the seat 108 at a position to the rear of the door 110 as shown in FIG. 8.

The system constituting this invention also has other advantages over the prior art. For example, the housing 12 is disposed adjacent the opening 40 and the optional conduit 42. This helps to minimize the time for the inflatable belt portion 104 to become inflated. It also minimizes the weight of the inflator 10 and the space occupied by the inflator. The minimization in the weight of the inflator 10 and the space occupied by the inflator also minimizes the amount of the pyrotechnic material 30 in the inflator. As previously described, the pyrotechnic material is preferably in particulate or granular form. The combustion of the pyrotechnic material 30 produces by-products and end products which do not require a filter to be included in the inflator.

When the inflatable belt portion 104 becomes inflated, it produces a large stress on the thin cloth defining the inflatable belt portion 104. This stress is absorbed by the separation of the inflatable belt portion 104 and the lap belt portion 112 at some of the stitches 134 in the pluralities 132a, 132b, 132c, 132d and 132e. Others of the stitches 134 may remain intact as do the stitches 136, 138, 140 and 142. In this way, the inflatable belt portion 104 and the lap belt portion 112 remain attached without any tearing of the cloth defining the inflatable belt portion 104.

The system of this invention is also advantageous in the disposition of the cover 105 (FIG. 9) in enveloping relationship to the inflatable belt portion 104 to protect the inflatable belt portion and control the inflation of the inflatable belt portion. The system is also advantageous in disposing the switch 141 in the retainer 122 to provide for the operation of the system only when the switch is closed by the disposition of the coupling member 116 in the retainer.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

What is claimed is:

1. In a combination for protecting an occupant in a vehicle in the event of a collision involving the vehicle,
    a unitary belt including an inflatable belt portion with first and second ends and a lap belt portion,
    the inflatable belt portion being constructed to extend upwardly to protect the chest, neck and head of the occupant when inflated and to be attached to the vehicle at the first end of the inflatable belt portion,
    the lap belt portion having first and second ends and being constructed to extend across the lap of the occupant and to be attached at the second end to the vehicle,
    attachment means for attaching the second end of the inflatable belt portion and the first end of the lap belt portion in an interrelationship providing for an absorption in the attachment means of force imposed on the lap belt portion as a result of the inflation of the inflatable belt portion, and
    guide means for guiding the lap belt portion from a disposition in the lap of the occupant to an upward direction toward said attachment means.

2. In a combination as set forth in claim 1, the lap belt portion being constructed to be attached to a retractor disposed at the second end of the lap belt portion for minimizing slack in the lap belt portion when the lap belt portion is disposed across the lap of the occupant,
    the retractor being constructed to become locked in position when a force is imposed which would otherwise produce a slack in the lap belt portion as a result of a collision of the vehicle.

3. In a combination for protecting an occupant in the event of a vehicular collision,
    a vehicle including a floor, a support structure, a seat having inboard and outboard sides and a retainer disposed near the inboard side of the seat and near the floor of the vehicle,
    a unitary belt including an inflatable belt portion and a lap belt portion,
    the inflatable belt portion being attached to the support structure at a position above the chest of the occupant when the occupant is seated in the seat, the inflatable belt portion extending downwardly and transversely across the chest of the occupant,
    the lap belt portion, having an inboard side and an outboard side, extending across the lap of the occupant from the outboard side of the seat to the inboard side of the seat, and having coupling means for attachment to the retainer,
    inflation means disposed relative to the inflatable belt portion for inflating the inflatable belt portion upon the occurrence of a collision involving the vehicle, and
    attachment means for attaching the inflatable belt portion and the lap belt portion in relationship to provide for the absorption of the force produced on the inflatable belt portion, as a result of the inflation of the inflatable belt portion, without producing a detachment of the lap belt portion from the inflatable belt portion.

4. In a combination as set forth in claim 3, wherein the coupling means redirects the lap belt portion at the inboard side of the seat from a direction along the lap of the occupant to a direction corresponding to the transverse direction of the inflatable belt portion to provide for an attachment of the lap belt portion to the inflatable belt portion by said attachment means.

5. In a combination as set forth in claim 3, a retractor disposed in the vehicle on the outboard side of the seat near the vehicle floor and constructed to dispose the lap belt portion on the retractor when the coupling means is detached from the retainer, thereby providing for the entrance of the occupant into the vehicle, and the exit of the occupant from the vehicle, without any obstruction from the inflatable belt portion.

6. In a combination as set forth in claim 3, the attachment means including pluralities of threads extending through the inflatable belt portion and the lap belt portion with such portions disposed in an overlapping relationship to each other.

7. In a combination as set forth in claim 6, the inflatable belt portion and the lap belt portion being disposed in an overlapping relationship along portions of their lengths, the threads being disposed in a zig-zag relationship along the overlapping portions of the inflatable and lap belt portions, the attachment means including additional threads extending laterally between the lateral extremities of the inflatable belt portion and the lap belt portion in the overlapping portions of the inflatable belt portion and the lap belt portion and additionally including threads extending diagonally between the opposite lateral extremities of the overlapping portions of the inflatable and lap belt portions in communication with the additional threads.

8. In a combination as set forth in claim 7, the vehicle including a retractor disposed near the floor at a position near the seat and constructed to dispose the lap belt portion on the retractor when the coupling means is released from the retainer so as to provide for an unobstructed entrance of the occupant into the vehicle and an unobstructed exit of the occupant from the vehicle, and the coupling means redirecting the lap belt portion at the inboard side of the lap belt portion from a direction along the lap of the occupant to the transverse direction of the inflatable belt portion to provide for an attachment of the lap belt portion to the inflatable belt portion.

9. In a combination for protecting an occupant in a vehicle in the event of a collision of the vehicle, the vehicle having a seat for the occupant with an inboard side and an outboard side, a support structure, an inboard retainer at the inboard side of the seat, and an outboard retainer at the outboard side of the seat, a unitary belt, including a lap belt portion and an inflatable belt portion, the inflatable belt portion having an upper end and a lower end, and the lap belt portion having an inboard end and an outboard end, a force being imposed on the inflatable belt portion when the inflatable belt portion becomes inflated, the lap belt portion being disposed to extend across the lap of the occupant, and the outboard end attached to the outboard retainer, means for interconnecting the lower end of the inflatable belt portion to the lap belt portion at the inboard end of the lap belt portion in a relationship to provide for a dissipation in such interconnecting means, without a detachment between the lap belt portion and the inflatable belt portion, by said force imposed on the inflatable belt portion when the inflatable belt portion becomes inflated, means disposed at the inboard end of the lap belt portion for coupling to the inboard retainer, and for guiding the lap belt portion to the inflatable belt portion, means disposed at the upper end of the inflatable belt portion for attaching the inflatable belt portion to the support structure, and the outboard retainer comprising a retractor disposed relative to the lap belt portion for minimizing slack in the lap belt portion upon the attachment of the coupling means to the inboard retainer, and for preventing the length of the lap belt portion from increasing when a force above a predetermined value is imposed on the lap belt portion in an effort to increase the length of the lap belt portion across the lap of the occupant.

10. In a combination for protecting an occupant in a vehicle in the event of a collision of the vehicle, the vehicle having a front door and a rear window and a support structure constituting a pillar between the front door and the rear window, a seat for the occupant with an inboard side and an outboard side, an inboard retainer at the inboard side of the seat, and an outboard retainer at the outboard side of the seat, a unitary belt including a lap belt portion and an inflatable belt portion, the lap belt portion having an inboard end and an outboard end, and the inflatable belt portion having an upper end and a lower end;

the lap belt portion being disposed to extend across the lap of the occupant, having a first coupling member at the inboard end for attachment to the inboard retainer, and for guiding the lap belt portion to the inflatable belt portion, the inflatable belt portion being attached to the lap belt portion at the inboard end of the lap belt portion, such inflatable belt portion extending from a position near the lap of the occupant at the inboard side of the seat upwardly across the chest of the occupant to the support structure in the vehicle, means disposed at the upper end of the inflatable belt portion for attaching the inflatable belt portion to the support structure, means for providing an inflation of the inflatable belt portion upon the occurrence of a collision involving the vehicle, the relative disposition between the inflatable belt portion and the lap belt portion providing for a tightening of the lap belt portion against the lap of the occupant when the inflatable belt portion becomes inflated, means for interconnecting the lap belt portion and the inflatable belt portion in a relationship to provide for an absorption in such interconnecting means, without a detachment between the lap belt portion and the inflatable belt portion, of the force imposed in the inflatable belt portion when the inflatable belt portion becomes inflated, and the outboard retainer comprising a retractor disposed relative to the lap belt portion for minimizing slack in the lap belt portion upon the attachment of the first coupling member to the inboard retainer, and for preventing the length of the lap belt portion from increasing when a force above a predetermined value is imposed on the lap belt portion in an effort to increase the length of the lap belt portion across the lap of the occupant.

11. In a combination for protecting an occupant in a vehicle in the event of a collision involving the vehicle, an inflatable belt portion disposed in a direction having a vertical component to define a top and a bottom to the inflatable belt portion, inflating means for inflating the inflatable belt portion from the top of the inflatable belt portion, and a lap belt portion operatively coupled to the inflatable belt portion at the bottom of the inflatable belt portion, the inflatable belt portion and the lap belt portion defining a unitary belt, and means for attaching the bottom of the inflatable belt portion and the lap belt portion to provide for a partial, but not a complete, detachment of the lap belt portion from the inflatable belt portion when the inflatable belt portion becomes inflated.

12. In a combination for protecting an occupant a vehicle in the event of a collision involving the vehicle, an inflatable belt portion disposed in a direction having a vertical component to define a top to the inflatable belt portion, inflating means for inflating the inflatable belt portion from the top of the inflatable belt portion, and a lap belt portion operatively coupled to the inflatable belt portion at a bottom of the inflatable belt portion, said lap belt portion extending across the lap of the occupant and being disposed relative to the inflatable belt portion to become tightened against the body of the occupant when the inflatable belt portion becomes inflated, the inflatable belt portion and the lap belt portion defining a unitary belt, means for attaching the bottom of the inflatable belt portion and the lap belt portion to provide for a partial, but not a complete, detachment of the lap belt portion from the inflatable belt portion when the inflatable belt portion becomes inflated, the inflating means including housing means with gas in the housing means and including particles of a pyrotechnic material disposed in an isolated relationship to the housing means before initiation of combustion of the particles of the pyrotechnic material and movable into the housing means after a partial combustion of the particles of the pyrotechnic material, and means for initiating the combustion of the particles of the pyrotechnic material upon the occurrence of a collision involving the vehicle.

13. An inflator device adapted for producing a sufficient quantity of a gaseous product to substantially inflate an inflatable member operatively associated therewith without substantial heating of said device or said member, said device comprising:

a housing defining a first interior volume, and having an inner surface having low thermal conductivity, said housing containing a pressurized gas at a first pressure in said interior volume, means for maintaining the pressurized gas at the first pressure within the interior volume and for opening when the gas attains a predetermined second higher pressure upon combustion of a pyrotechnic material within said housing to allow the gas to pass from the housing;

a container within the interior volume of the housing, having stored therein a quantity of the pyrotechnic material, which, upon combustion, produces combustion products that exit said container; and an ignitor in thermal contact with the pyrotechnic material, said ignitor including a first pyrotechnic firing compound which, upon combustion thereof, transfers heat to said pyrotechnic material, which, in turn, causes combustion of said pyrotechnic material, resulting in production of combustion products, wherein said first pressure is sufficiently high and the pyrotechnic material has a burning time which is sufficiently short, such that, upon combustion, said pyrotechnic material burns substantially completely and without substantial contact of burning material upon said inner surface as it leaves the container, such that the pressurized gas at said first pressure is heated by said combustion products, thereby increasing the gas pressure to at least said second pressure to cause said pressure maintaining means to open and said gas to exit said first interior volume in a time sufficiently short to substantially prevent transfer of heat to said housing.

14. The inflator device of claim 13, wherein the housing inner surface comprises a layer of a low thermal conductivity material.

15. The inflator device of claim 14, wherein the low thermal conductivity material in turn comprises at least one of epoxy, fiber glass, nylons polyethylene and a rubber.

16. The inflator device of claim 13, wherein said burning time is sufficiently short, such that combustion products exit said container in no more than about 1 ms.

17. The inflator device of claim 13, wherein said burning time of said pyrotechnic material is no more than about 5 ms.

18. The inflator device of claim 13, wherein said pyrotechnic material is present in an amount at least sufficient to provide a gas pressure during combustion of about 12,000 psi.

19. The inflator device of claim 13, wherein said pressure maintaining means is a rupturable diaphragm.

20. The inflator device of claim 13, wherein said second pressure is about 12,000 psi.

21. The inflator device of claim 13, wherein said burning time is sufficiently short, such that said pressurized gas exits said housing in no more than about 10 ms.

22. The inflator device of claim 13, wherein said inflatable member has an initial temperature before inflation and a final temperature after inflation, and said final temperature is no more than about 7° F. higher than said initial temperature.

23. A method of inflating an inflatable member having an interior volume without substantial heating of said inflatable member, the method comprising:

providing an inflator device comprising a housing defining a first interior volume, and having an inner surface having a low thermal conductivity, the housing containing a pressurized gas at a first pressure in said first interior volume, and means for maintaining the pressurized gas at the first pressure within the first interior volume and for opening when the gas attains a predetermined second higher pressure upon combustion of a pyrotechnic material within said housing to allow said gas to pass from said housing; and initiating an ignitor in thermal contact with said pyrotechnic material, said ignitor including a first pyrotechnic firing compound which, upon combustion thereof, transfers heat to said pyrotechnic material, which, in turn, causes combustion of said pyrotechnic material, resulting in production of combustion products, wherein heat from the combustion products is substantially entirely thermally transferred to said pressurized gas; wherein said first pressure is sufficiently high and the pyrotechnic material has a burning time which is sufficiently short, such that, upon combustion, said pyrotechnic material burns substantially completely and without substantial contact of burning material upon said inner surface, such that said pressurized gas at said first pressure is heated, thereby increasing the gas pressure to at least said second pressure to cause said pressure maintaining means to open and said gas to exit said first interior volume in a time sufficiently short to substantially prevent transfer of heat to said housing.

24. The method of claim 23, in which the inner surface of the housing means comprises a layer of a low thermal conductivity material.

25. The method of claim 24, in which the low thermal conductivity material in turn comprises at least one epoxy, fiber glass. polyethylene and rubber.

26. The method of claim 23, further comprising producing heat from the combustion of said pyrotechnic material in an amount at least sufficient to provide a gas pressure during combustion of about 12,000 psi.

27. The method of claim 23, further comprising burning said pyrotechnic material in a time sufficiently short for said pressurized gas to exit said housing in no more than about 10 ms.

28. The method of claim 23, further comprising storing said pyrotechnic material in a container within said first interior volume prior to initiating said ignitor, wherein combustion products exit said container no more than about 1 ms after initiating said ignitor.

29. The method of claim 23, further comprising opening said pressure maintaining means by rupturing a rupturable diaphragm.

30. The method of claim 23, further comprising opening said pressure maintaining means at a pressure of about 12,000 psi.

31. The method of claim 23, further comprising combusting said pyrotechnic material in a burning time of no more than 5 ms.

32. The method of claim 23, further comprising subjecting said inflatable member to a temperature increase of no more than about 7° F. during inflation.

33. In a combination for protecting an occupant in a vehicle in the event of a collision involving the vehicle, an inflatable member having an interior volume;

an inflator device operatively associated with said inflatable member, said inflator device adapted for producing a sufficient quantity of a gaseous product to substantially inflate the inflatable member without substantially heating said device or said member, said device comprising:

a housing defining a first interior volume, and having an inner surface having low thermal conductivity, the housing containing a pressurized gas at a first pressure in said first interior volume, means for maintaining the pressurized gas at the first pressure within the first interior volume and for opening when the gas attains a predetermined second higher pressure upon combustion of a pyrotechnic material within said housing to allow the gas to pass from the housing;

a container within the interior volume of the housing, having stored therein a quantity of the pyrotechnic material; and an ignitor in thermal contact with the pyrotechnic material, said ignitor including a first pyrotechnic firing compound which, upon combustion thereof, transfers heat to said pyrotechnic material, which, in turn, causes combustion of said pyrotechnic material, resulting in production of combustion products, wherein said first pressure is sufficiently high and the pyrotechnic material has a burning time which is sufficiently short, such that, upon combustion, said pyrotechnic material burns substantially completely and without substantial contact of burning material upon said inner surface, such that the pressurized gas at said first pressure is heated, thereby increasing the gas pressure to at least said second pressure to cause said pressure maintaining means to open and said gas to exit said first interior volume in a time sufficiently short to substantially prevent transfer of heat to said housing.

34. The combination as set forth in claim 33, in which the housing inner surface is comprised of a low thermal conductivity material.

35. The combination set forth in claim 34, in which the low thermal conductivity material is selected from the group consisting of an epoxy, fiber glass, polyethylene and a rubber.

36. The combination of claim 33, wherein said burning time is sufficiently short, such that combustion products exit said container in no more than about 1 ms.

37. The combination of claim 33, wherein said pressure maintaining means is a rupturable diaphragm.

38. The combination of claim 33, wherein said burning time of said pyrotechnic material is no more than about 5 ms.

39. The combination of claim 33, wherein said burning time is sufficiently short, such that said pressurized gas exits said housing in no more than about 10 ms.

40. The combination of claim 33, wherein said pyrotechnic material is present in an amount at least sufficient to provide a gas pressure during combustion of about 12,000 psi.

41. The combination of claim 33, wherein said second pressure is about 12,000 psi.

42. The combination of claim 33, wherein said inflatable member has an initial temperature before inflation and a final temperature after inflation, and said final temperature is no more than about 7° F. higher than said initial temperature.

43. In a combination for protecting an occupant in a vehicle in the event of a collision involving the vehicle, an inflatable seatbelt having an interior volume;

an inflator device operatively associated with said inflatable seatbelt, said inflator device adapted for producing a sufficient quantity of a gaseous product to substantially inflate the inflatable seatbelt without substantially heating said device or said seatbelt, said device comprising:

a housing defining a first interior volume, and having an inner surface having low thermal conductivity, the housing containing a pressurized gas at a first pressure in said first interior volume, means for maintaining the pressurized gas at the first pressure within the first interior volume, and for opening when the gas attains a predetermined second higher pressure upon combustion of a pyrotechnic material within said housing to allow the gas to pass from the housing;

a container within the first interior volume of the housing, having stored therein a quantity of the pyrotechnic material; and an ignitor in thermal contact with the pyrotechnic material, said ignitor including a first pyrotechnic firing compound which, upon combustion thereof, transfers heat to said pyrotechnic material, which, in turn, causes combustion of said pyrotechnic material, resulting in production of combustion products, wherein said first pressure is sufficiently high and the pyrotechnic material has a burning time which is sufficiently short, such that, upon combustion, said pyrotechnic material burns substantially completely and without substantial contact of burning material upon said inner surface, such that the pressurized gas at said first pressure is heated by said combustion products, thereby increasing the gas pressure to at least said second pressure to cause said pressure maintaining means to open and said gas to exit said first interior volume in a time sufficiently short to substantially prevent transfer of heat to said housing; and wherein when said gaseous product is produced, said gaseous product is directed to and inflates said seatbelt to protect the occupant from injury due to a collision involving the vehicle.

44. The combination set forth in claim 43, wherein the housing inner surface is comprised of low thermal conductivity material.

45. The combination set forth in claim 44, wherein the low thermal conductivity material is selected from the group consisting of epoxy, fiber glass, polyethylene and a rubber.

46. The combination of claim 43, wherein said burning time is sufficiently short, such that combustion products exit said container in no more than about 1 ms.

47. The combination of claim 43, wherein said pressure maintaining means is a rupturable diaphragm.

48. The combination of claim 43, wherein said burning time of said pyrotechnic material is no more than about 5 ms.

49. The combination of claim 43, wherein said burning time is sufficiently short, such that said pressurized gas exits said housing in no more than about 10 ms.

50. The combination of claim 43, wherein said pyrotechnic material is present in an amount at least sufficient to provide a gas pressure during combustion of about 12,000 psi.

51. The combination of claim 43, wherein said second pressure is about 12,000 psi.

52. The combination of claim 43, wherein said inflatable member has an initial temperature before inflation and a final temperature after inflation, and said final temperature is no more than about 7° F. higher than said initial temperature.

* * * * *